US009402213B2

(12) United States Patent
Lee et al.

(10) Patent No.: US 9,402,213 B2
(45) Date of Patent: Jul. 26, 2016

(54) DYNAMIC CHANNEL SWITCHING FOR WIRELESS MESH NETWORKS

(71) Applicant: Telekom Malaysia Berhad, W.P. Kuala Lumpur (MY)

(72) Inventors: Chin Kwang Lee, Johor (MY); Chee Keong Tan, Johor (MY); Chun Yeow Yeoh, Selangor (MY); Wee Keong Lim, Melaka (MY); Mohammad Harris Bin Mokhtar, Bandar Baru Bangi (MY)

(73) Assignee: TELEKOM MALAYSIA BERHAD, Kuala Lumpur (MY)

( * ) Notice: Subject to any disclaimer, the term of this patent is extended or adjusted under 35 U.S.C. 154(b) by 0 days.

(21) Appl. No.: 14/448,740

(22) Filed: Jul. 31, 2014

(65) Prior Publication Data

US 2016/0037396 A1   Feb. 4, 2016

(51) Int. Cl.
| | |
|---|---|
| *H04W 36/24* | (2009.01) |
| *H04W 40/24* | (2009.01) |
| *H04W 40/12* | (2009.01) |
| *H04W 36/00* | (2009.01) |
| *H04W 72/08* | (2009.01) |
| *H04W 24/00* | (2009.01) |
| *H04W 36/30* | (2009.01) |
| *H04W 84/12* | (2009.01) |

(52) U.S. Cl.
CPC .......... *H04W 36/0055* (2013.01); *H04W 24/00* (2013.01); *H04W 72/085* (2013.01); *H04W 36/30* (2013.01); *H04W 84/12* (2013.01)

(58) Field of Classification Search
CPC ..... H04L 45/22; H04L 45/124; H04W 40/24; H04W 40/12; H04W 40/00; H04W 24/00; H04W 36/06; H04W 36/0016; H04W 84/18; H04W 40/16; H04W 36/24

USPC .......................................................... 370/329
See application file for complete search history.

(56) References Cited

U.S. PATENT DOCUMENTS

| | | | | |
|---|---|---|---|---|
| 2002/0122405 | A1* | 9/2002 | Liang ..................... | H04W 16/14 370/344 |
| 2006/0114836 | A1* | 6/2006 | Pollin ....................... | H04L 1/24 370/252 |
| 2006/0242457 | A1* | 10/2006 | Roy ....................... | H04W 36/06 714/12 |
| 2007/0274228 | A1* | 11/2007 | Nandagopalan ........ | H04L 45/12 370/252 |

(Continued)

FOREIGN PATENT DOCUMENTS

EP          1936878 A1       6/2008

OTHER PUBLICATIONS

M. Ihmig, et. al., "Distributed dynamic channel selection in chaotic wireless networks", 13th European Wireless Conference, 2007.*

*Primary Examiner* — Noel Beharry
*Assistant Examiner* — Ruihua Zhang
(74) *Attorney, Agent, or Firm* — Cesari and McKenna, LLP

(57) ABSTRACT

The present invention relates to a method of dynamic channel switching in a wireless mesh network that is in conformance with an IEEE 802.11s standard. The method comprises the steps of transmitting a request frame to a node for scanning a channel associated with the node; determining a link quality of the channel; receiving a response frame from the node; and switching to the channel if the switching metric is larger than a switching threshold, wherein if otherwise, remain unswitched. The switching metric integrates the interference, transmission frame size, latency of channel switching and data rate of the node on the channel.

18 Claims, 4 Drawing Sheets

(56) References Cited

U.S. PATENT DOCUMENTS

| | | | |
|---|---|---|---|
| 2010/0172249 A1* | 7/2010 | Liu | H04L 45/124 370/252 |
| 2012/0026899 A1* | 2/2012 | Lee | H04L 45/22 370/252 |
| 2014/0086080 A1* | 3/2014 | Hui | H04L 45/124 370/252 |
| 2014/0086081 A1* | 3/2014 | Mack | H04L 5/006 370/252 |
| 2015/0067184 A1* | 3/2015 | Parthasarathy | H04L 65/60 709/231 |

* cited by examiner

DYNAMIC CHANNEL SWITCHING FOR WIRELESS MESH NETWORKS

BACKGROUND OF THE INVENTION

1. Field of the Invention

The present invention relates generally to wireless mesh networks. More particularly, the present invention relates to dynamic channel switching in a wireless mesh network that conforms to an IEEE 802.11s standard.

2. Background Information

Wireless mesh network is a communication network that made of radio nodes organized in a mesh topology. A typical wireless mesh network which aims to provide ubiquitous high bandwidth access for a large number of users often consists of mesh clients, mesh routers and gateways. The integration of the wireless mesh network with other networks such as the Internet, cellular, IEEE 802.11, IEEE 802.15, IEEE 802.16, sensor networks and many more can be accomplished through the gateways and bridging functions in the mesh routers.

In recent years, the wireless mesh network together with related application and services have been actively researched. The wireless mesh network is envisioned as an economically viable paradigm and promising technology for supporting high speed multimedia services. A wireless mesh network that conforms to the IEEE 802.11s is a network that supports direct communication between a plurality of wireless devices having a relay function without utilizing an access point. In the wireless mesh network which is interference-limited, the channel bandwidth is insufficient due to limited spectrum that is shared with numerous mesh links within the network. Co-channel interference, in addition, that is caused by excessive power usage and bad frequency planning is detrimental to the network system capacity and quality of service. Hence, a wireless mesh network that efficiently utilizes network resources and reduces the co-channel interference is crucial.

It is found that one effective way to manage the network resources as well as mitigating the co-channel interference is to employ dynamic channel switching. The dynamic channel switching enables the wireless mesh network to avoid severe interferences in certain parts of the coverage area by shifting to other idle or vacant or less severe channels. The dynamic channel switching virtualizes a wireless mesh network by operating in different frequency channels at different periods of time but not disrupting the network connections. Also, the dynamic channel switching allows the mesh nodes to interact toward each other regardless of their frequency.

The typical prior art approach includes channel scanning and signaling mechanism for the wireless mesh network based on modification on default channel switching announcement frame. Conventionally, the dynamic channel switching is initiated by a default protocol which considers only the interference that is detected, e.g. radar event and the like, on the channel. The default protocol also fails to propose an interference limit beyond which the interference is detrimental to the network connection that requires channel switching. However, the channel switching based on the interference only, at sometimes, is unnecessary and provides no improvements to the quality of service. EP Publication No. 1 936 878, for example, describes a distributed method for channel assignment based on physical and logical factors. The prior art fails to anticipate the dynamic channel switching for the wireless mesh network that utilizes or quantifies factors other than the abovementioned factors that might essential for the switching.

A need therefore exists for providing a method of channel switching for the wireless mesh network that allows for autonomous decision making by quantifying various relevant factors. Thus, the present invention seeks to provide a method of dynamic channel switching for use in the wireless mesh network.

SUMMARY OF THE INVENTION

The following presents a simplified summary of the invention in order to provide a basic understanding of some aspects of the invention. This summary is not an extensive overview of the invention. Its sole purpose is to present some concepts of the invention in a simplified form as a prelude to the more detailed description that is presented later.

Accordingly, the present invention provides a method of dynamic channel switching for use in a wireless mesh network. The method comprises the steps of transmitting a request frame to a node for scanning a channel associated with the node; determining a link quality of the channel; receiving a response frame from the node; and switching to the channel if a switching metric is larger than a switching threshold. If otherwise, remain unswitched.

In one embodiment, the switching metric comprises an integration of transmission frame size, latency of channel switching and data rate of the node on the channel. Preferably, the switching metric is a ratio of the data rate of the node on the channel multiplied by the transmission frame size minus the latency of channel switching.

The request frame comprises a source address and a destination address. Preferably, the request frame is a request-to-scan frame. The request frame is a plurality of request frames.

The response frame comprises a channel identity and corresponding link quality, and channel state information. Preferably, the response frame is a response-to-scan frame. The response frame is a plurality of response frames. The link quality is determined based on a signal-to-noise and distortion ratio of the channel.

In another embodiment, the node is a plurality of nodes. The channel is a plurality of channels.

The method of dynamic channel switching further comprises the steps of receiving the request frame; and transmitting the response frame. The method further includes the steps of ranking the channel based on the link quality and calculating the switching metric The method further comprises the steps of transmitting a switching announcement frame to neighboring nodes; and receiving the switching announcement frame.

It is an advantage of the present invention to provide a method of dynamic channel switching that is autonomous by way of introducing a switching metric in execution of the steps. The switching metric considers achievable data rate on the channel, size of frame to transmit, and latency of the channel switching as the factors that decide the channel switching.

It is another advantage of the present invention to provide a method of dynamic channel switching that increases connectivity of the node in the wireless mesh network beyond the number of physical nodes present therein which provides more rooms for optimization to a routing protocol.

It is yet another advantage of the present invention to provide a method of dynamic channel switching that enables each pair of interacting nodes to connect over the least loaded channel, and thus, utilizing the allocated frequency spectrum at the best.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

A more complete appreciation of the invention and many of the attendant advantages thereof will be readily as the same becomes better understood by reference to the following detailed description when considered in connection with the accompanying drawings, wherein.

It is noted that the drawings may not be to scale. The drawings are intended to depict only typical aspects of the invention, and therefore should not be considered as limiting the scope of the invention. In the drawings, like numberings represent like elements between the drawings.

DETAILED DESCRIPTION OF AN ILLUSTRATIVE EMBODIMENT

In the following description, for purposes of explanation, numerous details are set forth, such as flowcharts and system configurations, in order to provide an understanding of one or more embodiments of the present disclosure. However, it is and will be apparent to one skilled in the art that these specific details are not required in order to practice the present disclosure.

As used herein, a "wireless mesh network" may describe a communication network made up of nodes organized in a mesh topology that consists of mesh clients, mesh routers and gateways.

A "dynamic channel switching" may describe a dynamic assignment strategies that allow any nodes to be assigned any channel, and nodes can frequently switch from one channel to another, and thereby offering the potential to use many channels with few nodes.

A "node" or mesh node may describe two types of nodes: mesh routers and mesh clients. The mesh routers contain additional routing functions to support mesh networking. The mesh clients which have a higher variety of devices may have necessary function for mesh networking and thus, can also work as a router.

A "frame" may describe three main types: management, data, and control. The management frame contains subtypes for nodes to associate and dissociate with networks, and frames for probing for the availability of an already known network. A beacon or announcement frame that announces the presence and configuration of a network is also part of the management frame. The data frame contains an additional address to allow roaming between different access points. The control frame includes data frame acknowledgement, request-to-scan frame, and response-to-scan frame used for virtual carrier sensing, and various other frames.

The present disclosure aims to provide a method of dynamic channel switching having a switching metric for use in a wireless mesh network that in conformance with the IEEE 802.11s standard. The method in the present disclosure is autonomous which provides switching decisions or commands independently to best utilize network resources and to mitigate co-channel interference.

Figure 1:
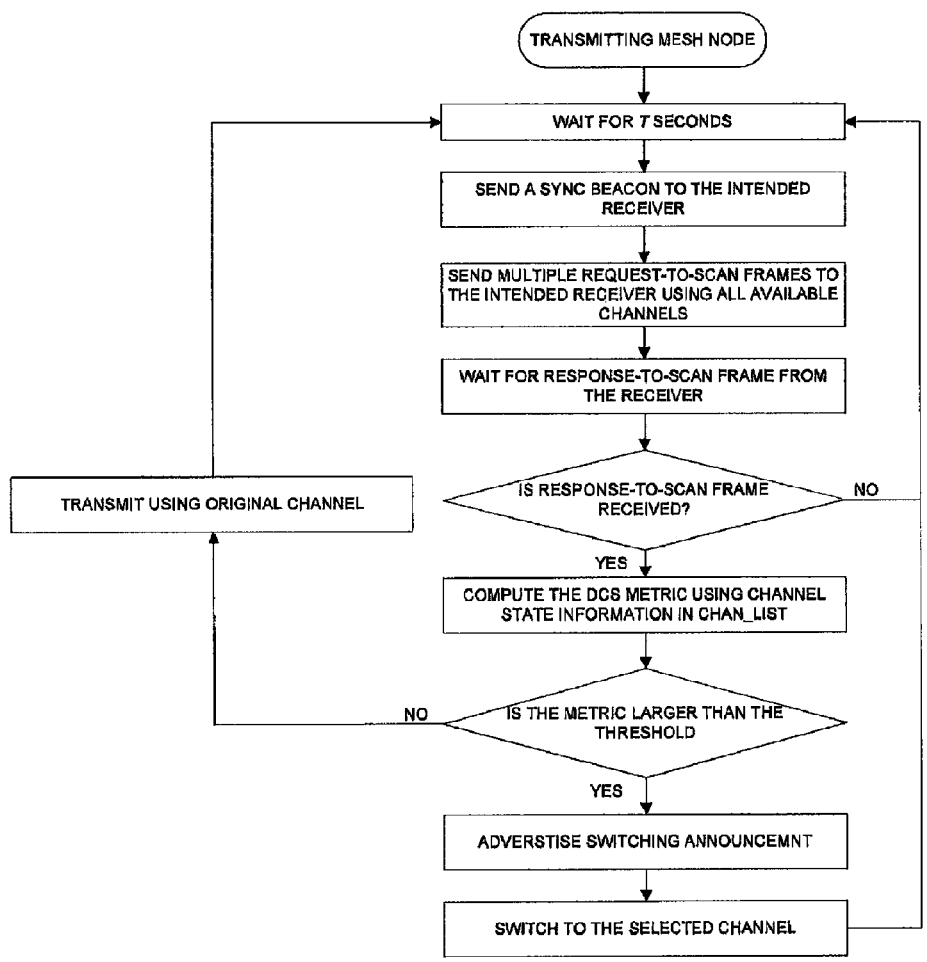
FIG. 1 is a flowchart which depicts the method of dynamic channel switching at the transmitting mesh node.

The method of dynamic channel switching which is periodical and distributive, as shown in FIG. 1, may start at a node, particularly at a transmitting node. At a predetermined waiting time, a sync beacon is transmitted to a receiving node that is presence in the wireless mesh network. The transmitting node transmits a plurality of request frames to the receiving nodes through a channel or channels associated with the transmitting node for scanning purposes. Preferably, the request frame is being transmitted over every available channel in the network. More preferably, the request frame is a request-to-scan frame. The request-to-scan frame which is one of the control frames may comprise a source address and a destination address. The request-to-scan frame may also include duration of the entire transmission sequence.

The receiving node confirms the transmission by sending a response frame to the transmitting node. If, within a prescribed time or a short interframe space, the transmitting node fails to receive the response frame, a new transmission sequence for sending the request frame is executed. If otherwise, the transmitting node proceeds to calculate the switching metric based on the information provided by the receiving node via the response frame. The switching metric is used to provide a value for deciding the next course of action by comparing the value with a switching threshold. If the value of the switching metric is smaller than the switching threshold, the transmitting node remains at the prevailing channel. If the value of the switching metric is larger than the switching threshold, the transmitting node switches to a new channel.

In response to the channel switching, a switching announcement frame is generated and being transmitted to the neighboring nodes as to inform the peers of the decision. The above steps continue to loop and repeat over the cycle for the transmitting node.

Figure 2:
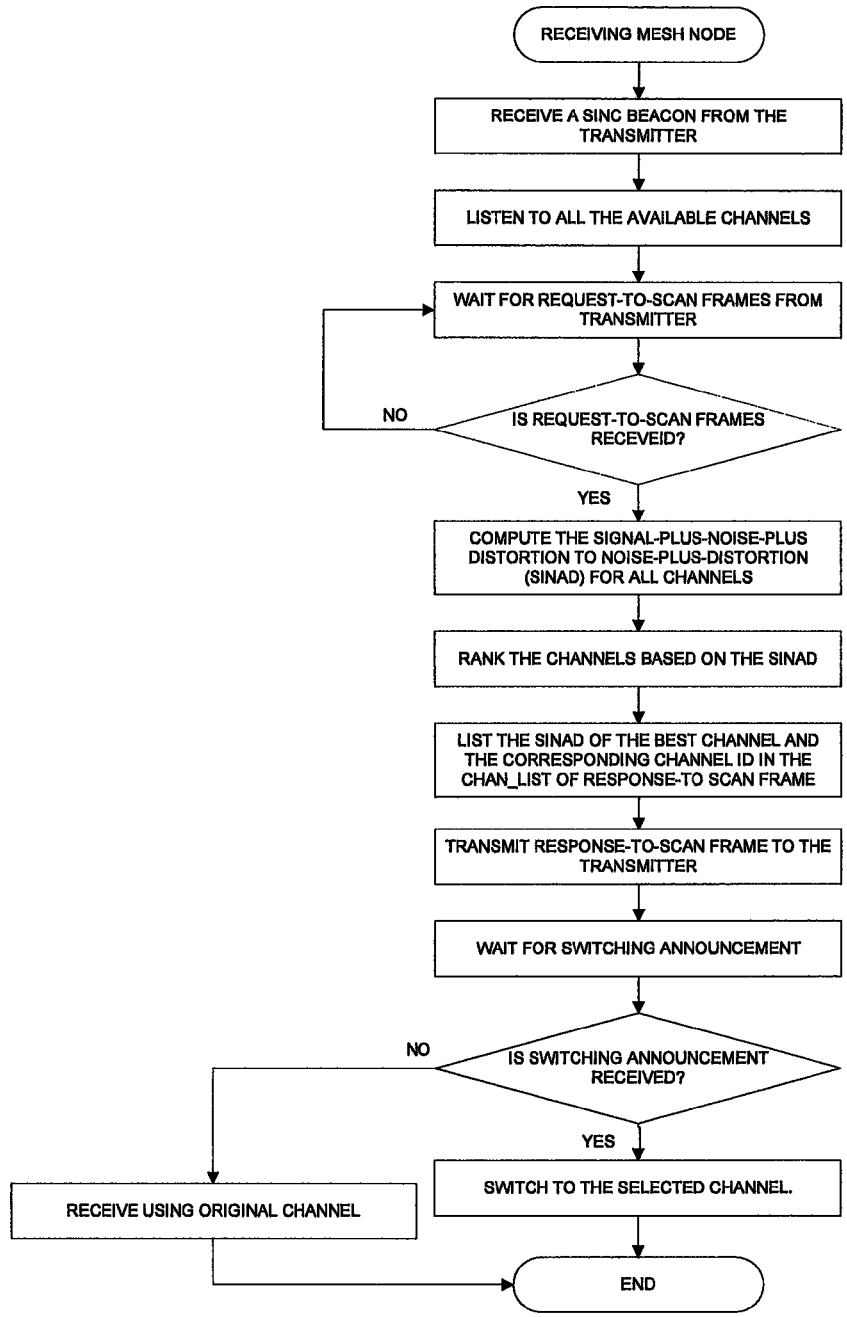
FIG. 2 is a flowchart which depicts the method of dynamic channel switching at the receiving mesh node.

The method of dynamic channel switching at the receiving node is depicted as in FIG. 2. The receiving node receives the sync beacon that is transmitted by the transmitting node. The receiving node, basically, assess the availability of the channel by listening for ongoing traffic. Within another predetermined waiting time, the receiving node receives the request frame from the transmitting node. Upon receipt of the request frame, the receiving node determines a link quality of the channel. Preferably, the link quality is determined based on a signal-to-noise and distortion (SINAD) ratio of the channel associated with the node. The channels are then sorted in an order of descending rank SINAD ratio. The channel with the highest SINAD ratio that is first ranked is embedded into the response frame. The said channel and corresponding SINAD ratio preferably is incorporated into a portion of the response frame which is named as CHAN_LIST. The response frame which comprises an identity of the channel and corresponding SINAD is then transmitted to the transmitting node. The response frame may also comprise channel state information. Preferably, the response frame is a response-to-scan frame.

Upon receipt of the switching announcement frame from the transmitting node, the receiving node switches to the new channel and resumes transmission over the said channel. If the receiving node fails to receive the switching announcement frame, the transmission remains on the prevailing channel or being unswitched. The above steps continue to loop and repeat over the cycle for the receiving node.

The switching metric integrates factors such as transmission frame size, latency of channel switching, and data rate of the node on the channel. Preferably, the switching metric is a ratio of the data rate of the node on the channel multiplied by the transmission frame size minus the latency of channel switching as in (1).

$$\frac{(r_{i,k} - r_{i,j})f_i}{r_{i,k}r_{i,j}} - \delta > \Delta \quad (1)$$

where
$f_i$ is the transmission frame size in bits;
$\delta$ is the latency of channel switching;
$r_{i,j}$ is the data rate of node i on channel j; and
$\Delta$ is the switching threshold.
The data rate of the node on the channel is as in (2)

$$r_{i,j} = w \log_2(1+\gamma_{i,j}) \quad (2)$$

where
w is the bandwidth of the channel selected; and
$\gamma_{i,j}$ is the SINAD ratio of the node i on channel j.

The switching metric basically advises the time that is saved if the transmission switches to the new channel as shown in (1). If the switching metric or the time saved is larger than the switching threshold, the node switches to a new channel for a better transmission. If the transmission frame size is relatively small and the time to transmit the frame is relatively negligible as compared to the latency of channel switching, the node remains the transmission over the prevailing channel. Such condition of being unswitched is found rational since the node has an empty or nothing to transmit even the node can acquire higher data rate.

The present invention will now be described in further detail by way of example.

Figure 3A:
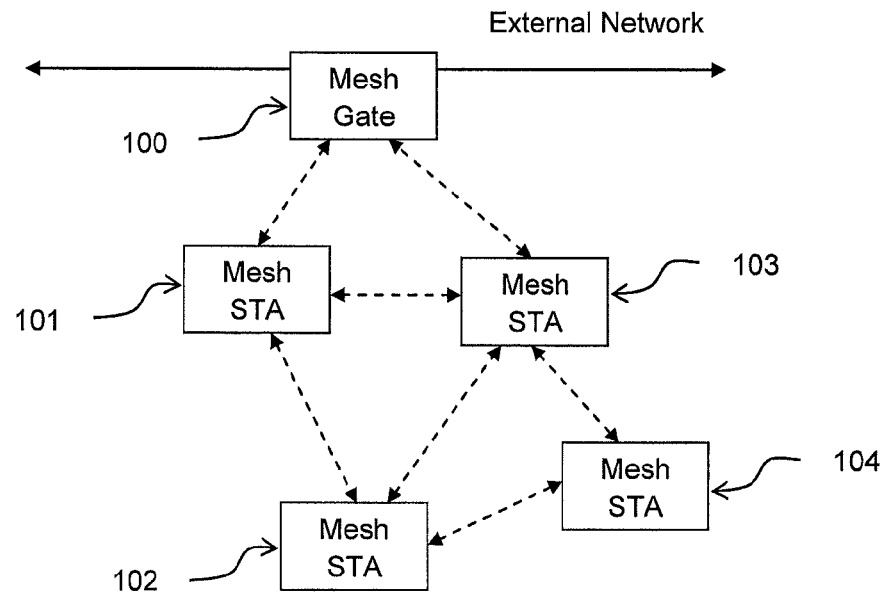
FIG. 3 is a series of FIGS. 3a to 3d which envisages an exemplary structure of a wireless mesh network.

FIG. 3a shows one exemplary wireless mesh network according to embodiments of the present disclosure. The wireless mesh network comprises a mesh gate 100 that communicates with a plurality of mesh stations 101 102 103 104 and an external network.

Figure 3B:
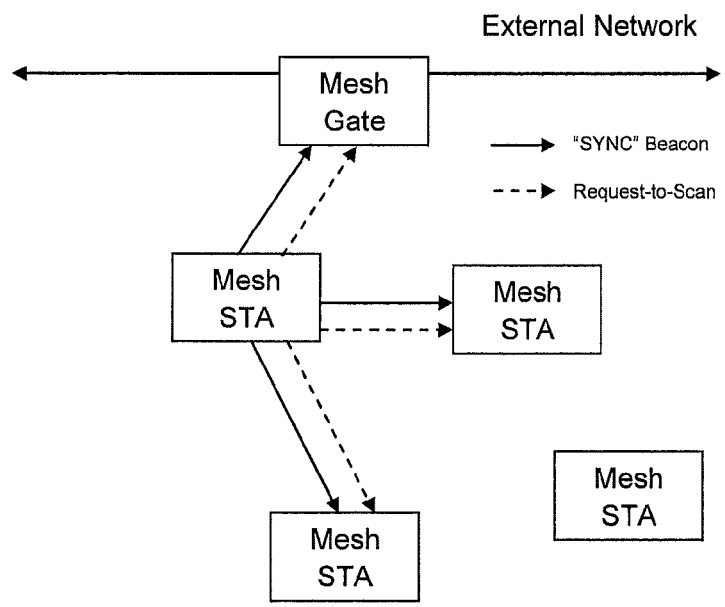

The mesh station 101, in FIG. 3b, intends to perform channel switching. A sync beacon (solid arrow line) is broadcasted to all the mesh stations 102 103 104 and the mesh gate 100. After a specified beacon interval, request-to-scan frames are transmitted over all available channels of the neighboring mesh stations 102 103 and the mesh gate 100. The request-to-scan frames are denoted by a dotted arrow line. For example, if the wireless mesh network comprises eleven channels, a number of eleven request-to-scan frames are being transmitted to each of the neighboring mesh station.

Figure 3C:
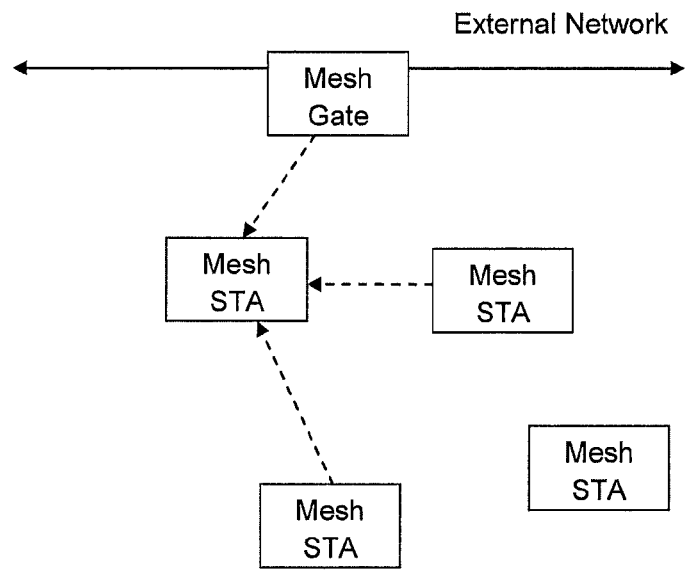
Figure 3D:
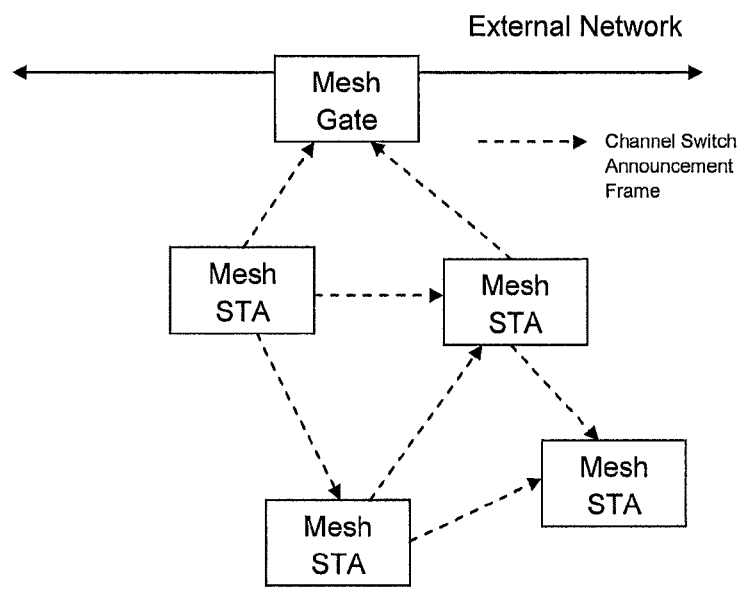

FIG. 3c shows the dotted arrow lines directed into the mesh station 101 which contain response-to-scan frames after listening to all available channels. The response-to-scan frames include the ranking of the channels based on the SINAD ratio. If the mesh station 101 decides to switch to the new channel, a switching announcement frame is propagated to the mesh stations 102 103 104 and the mesh gate 100 as shown in FIG. 3d. The propagation of the switching announcement frame which is shown as a dotted arrow line in FIG. 3d is in accordance with Section 11.9.7 as defined in the IEEE 802.11s-2011.

While this invention has been particularly shown and described with reference to the exemplary embodiments thereof, it will be understood by those skilled in the art that various changes in form and details may be made therein without departing from the scope of the invention as defined by the appended claims.

The invention claimed is:

1. A method of dynamic channel switching for a wireless mesh network, the method comprising:
transmitting a request frame to a node for scanning a channel associated with the node;
determining a link quality of the channel by the node;
receiving a response frame from the node; and
switching to the channel if a switching metric value is larger than a switching threshold, wherein the switching metric value is based on a ratio of a data rate of the node on the channel multiplied by a transmission frame size minus a latency of channel switching, and wherein if the switching metric value is not larger than the switching threshold not switching to the channel.

2. The method according to claim 1, wherein the request frame comprises a source address and a destination address.

3. The method according to claim 1, wherein the request frame is a request-to-scan frame.

4. The method according to claim 1, wherein the response frame comprises a channel identity and a corresponding link quality.

5. The method according to claim 1, wherein the response frame comprises channel state information.

6. The method according to claim 1, wherein the response frame is a response-to-scan frame.

7. The method according to claim 1, wherein the link quality is determined based on a signal-to-noise and distortion ratio of the channel.

8. The method according to claim 1, further comprising.
receiving the request frame; and
transmitting the response frame.

9. The method according to claim 1, including ranking the channel based on the link quality.

10. The method according to claim 1, including calculating the switching metric value.

11. The method according to claim 1, further comprising transmitting a switching announcement frame to neighboring nodes.

12. The method according to Claim 11, further comprising receiving the switching announcement frame.

13. The method according to claim 1, wherein the request frame is a plurality of request frames.

14. The method according to claim 1, wherein the node is a plurality of nodes.

15. The method according to claim 1, wherein the channel is a plurality of channels.

16. The method according to claim 1, wherein the response frame is a plurality of response frames.

17. A method for switching in a mesh network, the method comprising:
transmitting, from a transmitting node to a receiving node, one or more request frames through one or more channels of the mesh network, wherein the transmitting node utilizes a prevailing channel of the one or more channels;
receiving, at the transmitting node from the receiving node, one or more response frames that include data associated with link quality of a new channel of the one or more channels;
calculating, by the transmitting node, a switching metric value utilizing the data associated with the link quality of the new channel, wherein the switching metric value is based on a ratio of a data rate of the receiving node on the new channel multiplied by a transmission frame size minus a latency of channel switching;
in response to determining, by the transmitting node, that the switching metric value is smaller than a switching threshold, utilizing the prevailing channel by the transmitting node; and
in response to determining, by the transmitting node, that the switching metric value is larger than the switching threshold, switching the transmitting node from the prevailing channel to the new channel.

18. A method for switching in a mesh network, the method comprising:
- receiving, at a receiving node from a transmitting node, one or more request frames through one or more channels of the mesh network, wherein the transmitting node utilizes a prevailing channel of the one or more channels;
- determining, by the receiving node, a link quality of a new channel of the one or more channels;
- transmitting, by the receiving node to the transmitting node, one or more frame responses that include information associated with the link quality of the new channel;
- switching the transmitting node from the prevailing channel to the new channel based on a determination that a switching metric value, calculated utilizing the information associated with the link quality of the new channel, is larger than a switching threshold, wherein the switching metric value is based on a ratio of a data rate of the receiving node on the new channel multiplied by a transmission frame size minus a latency of channel switching; and
- keeping the transmitting node on the prevailing channel and not switching to the new channel based on a determination that the switching metric value is smaller than the switching threshold.

* * * * *